United States Patent
Cho et al.

(10) Patent No.: US 9,939,680 B2
(45) Date of Patent: Apr. 10, 2018

(54) LIGHT DIFFUSION PLATE AND DISPLAY APPARATUS HAVING THE SAME

(71) Applicant: SAMSUNG ELECTRONICS CO., LTD., Suwon-si (KR)

(72) Inventors: Byoung-Jin Cho, Anyang-si (KR); Dae-Hee Lee, Hwaseong-si (KR); Yoon Ki Park, Suwon-si (KR); Ho Seok Lee, Asan-si (KR); Nae-Won Jang, Seongnam-si (KR); Han Mi Choi, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 111 days.

(21) Appl. No.: 15/171,077

(22) Filed: Jun. 2, 2016

(65) Prior Publication Data

US 2017/0160591 A1    Jun. 8, 2017

(30) Foreign Application Priority Data

Dec. 7, 2015 (KR) .................. 10-2015-0173272

(51) Int. Cl.
*G02F 1/1335* (2006.01)
*G02B 5/02* (2006.01)

(52) U.S. Cl.
CPC ....... *G02F 1/133606* (2013.01); *G02B 5/021* (2013.01); *G02B 5/0221* (2013.01); *G02B 5/0257* (2013.01); *G02B 5/0263* (2013.01); *G02B 5/0278* (2013.01); *G02F 1/133605* (2013.01); *G02F 1/133611* (2013.01); *G02F 2001/133613* (2013.01)

(58) Field of Classification Search
CPC ......... G02F 1/133606; G02F 1/133605; G02F 1/133611; G02B 5/0257
See application file for complete search history.

(56) References Cited

U.S. PATENT DOCUMENTS

| | | | |
|---|---|---|---|
| 4,673,254 | A | 6/1987 | Kato et al. |
| 2010/0046202 | A1 | 2/2010 | Joo et al. |

(Continued)

FOREIGN PATENT DOCUMENTS

| | | |
|---|---|---|
| GB | 2439556 B | 12/2009 |
| JP | 2010-186679 A | 8/2010 |

(Continued)

OTHER PUBLICATIONS

Communication dated Mar. 20, 2017 issued by the European Patent Office in counterpart European Patent Application No. 16170335.0.

(Continued)

*Primary Examiner* — Joseph L Williams
(74) *Attorney, Agent, or Firm* — Sughrue Mion, PLLC

(57) ABSTRACT

Provided is a display apparatus includes a display panel, a light source configured to emit light toward the display panel, a light diffusion plate disposed between the display panel and the light source such that light emitted from the light source is diffused and guided to the display panel, and at least one light diffusion layer provided on the light diffusion plate, having a light source corresponding portion corresponding to the light source, and including a plurality of light transmitting portions provided with a higher density at an edge portion of the light source corresponding portion than at a central portion of the light source corresponding portion.

20 Claims, 19 Drawing Sheets

(56) References Cited

U.S. PATENT DOCUMENTS

| | | |
|---|---|---|
| 2010/0061096 A1 | 3/2010 | Sato |
| 2010/0085733 A1 | 4/2010 | Yoo et al. |
| 2010/0265694 A1 | 10/2010 | Kim et al. |
| 2011/0285922 A1 | 11/2011 | Ikuta |
| 2012/0327330 A1 | 12/2012 | Takahashi et al. |
| 2014/0333873 A1 | 11/2014 | Hyung et al. |

FOREIGN PATENT DOCUMENTS

| | | |
|---|---|---|
| KR | 10-2014-0132259 A | 11/2014 |
| KR | 10-2014-0132913 A | 11/2014 |

OTHER PUBLICATIONS

Communication dated Sep. 30, 2016 issued by the International Searching Authority in counterpart International Application No. PCT/KR2016/006056.

Communication dated Nov. 16, 2017, issued by the European Patent Office in counterpart European application No. 16 170 335.0.

ized structure. The light diffusion plate may be

LIGHT DIFFUSION PLATE AND DISPLAY APPARATUS HAVING THE SAME

CROSS-REFERENCE TO RELATED APPLICATIONS

This application claims the benefit of Korean Patent Application No. 10-2015-0173272, filed on Dec. 7, 2015 in the Korean Intellectual Property Office, the disclosure of which is incorporated herein by reference.

BACKGROUND

1. Field

Apparatuses consistent with exemplary embodiments of the present inventive concept relate to a light diffusion plate and a display apparatus having the same, and more particularly, to a light diffusion plate having an improved structure to uniformly diffuse light emitted from a light source and a display apparatus having the same.

2. Description of the Related Art

A display apparatus is an apparatus configured to display a broadcasting signal or image data in various formats by using a display panel for displaying an image.

The display panel may be divided into an emissive display panel which emits light by itself and a non-emissive display panel which does not emit light by itself. The emissive display panel includes a cathode ray tube (CRT) panel, an electro-luminescence (EL) panel, an organic light emitting diode (OLED) panel, a vacuum fluorescence display (VFD) panel, a field emission display (FED) panel, a plasma display panel (PDP), etc., and the non-emissive display panel includes a liquid crystal display (LCD) panel, etc.

The liquid crystal display panel includes a backlight unit emitting white light and a display panel transmitting or blocking the light emitted from the backlight unit.

In the recent years, a display having a slim design is getting more attention. However, if the thickness of the backlight unit is decreased to correspond to the slimming of the display apparatus, the distance between the light source and the light diffusion plate is decreased, which leads to non-uniform brightness on the entire surface of the liquid crystal display panel. That is, a mura may be caused on the liquid display panel.

Accordingly, there have been various attempts to ensure a slim design of the display apparatus and a uniform brightness on the entire area of the liquid display panel.

SUMMARY

An aspect of the present inventive concept provides a light diffusion plate that has an improved structure ensuring a uniform brightness on the entire surface of the display panel, and a display apparatus having the same.

Another aspect of the present inventive concept provides a light diffusion plate that has an improved structure ensuring a slim design of the display apparatus, and a display apparatus having the same.

Additional aspects of the present inventive concept will be set forth in part in the description which follows and, in part, will be obvious from the description, or may be learned by practice of the inventive concept.

In accordance with one aspect of the present inventive concept, a display apparatus includes a display panel, a light source, a light diffusion plate and at least one light diffusion layer. The light source may be configured to emit light toward the display panel. The light diffusion plate may be disposed between the display panel and the light source such that light emitted from the light source is diffused and guided to the display panel. The at least one light diffusion layer may be provided on the light diffusion plate, having a light source corresponding portion corresponding to the light source, and including a plurality of light transmitting portions provided with a higher density at an edge portion of the light source corresponding portion than at a central portion of the light source corresponding portion.

A density of the plurality of light transmitting portions may be increased as a distance from the central portion of the light source corresponding portion increases.

The at least one light diffusion layer may further include a plurality of light reflecting portions that may be formed between the plurality of light transmitting portions and filled with white ink.

The at least one light diffusion layer may be provided on an incident surface of the light diffusion plate onto which light emitted from the light source is incident.

Sizes of the plurality of light transmitting portions in the central portion of the light source corresponding portion may be smaller than sizes of the plurality of light transmitting portions in the edge portion of the light source corresponding portion.

Intervals between the plurality of light transmitting portions in the edge portion of the light source corresponding portion may be smaller than intervals between the plurality of light transmitting portions in the central portion of the light source corresponding portion.

The light source corresponding portion may include a plurality of first rows arranged in a first direction, and a plurality of second rows arranged in a second direction and forming a plurality of intersections by crossing the plurality of first rows, wherein the plurality of light transmitting portions may be formed on the plurality of intersections.

Sizes of the plurality of light transmitting portions formed along at least one of the plurality of first rows and the plurality of second rows may be increased as a distance from the central portion of the light source corresponding portion increases.

At least one of an interval between the plurality of first rows and an interval between the plurality of second rows may be decreased as a distance from the central portion of the light source corresponding portion increases.

The plurality of light transmitting portions may be formed around a circumference of the central portion of the light source corresponding portion, each light transmitting portion being larger than an adjacent light transmitting portion disposed in a direction toward the central portion of the light source corresponding portion.

The plurality of light transmitting portions may include a closed loop shape.

Thicknesses of the plurality of light transmitting portions may be increased as a distance from the central portion of the light source corresponding portion increases.

Intervals between light transmitting portions adjacent to each other among the plurality of light transmitting portions may be decreased as a distance from the central portion of the light source corresponding portion increases.

The at least one light diffusion layer may include: a first light diffusion layer provided on a first surface of the light diffusion plate onto which light emitted from the light source is incident; and a second light diffusion layer provided on a second surface of the light diffusion plate facing the display panel.

The at least one light diffusion layer may be integrally formed with the light diffusion plate.

The at least one light diffusion layer may be provided in the form of a film, and the at least one light diffusion layer may be attached to the light diffusion plate.

The at least one light diffusion layer may include a first pattern in the central portion and a second pattern in the edge portion, and the first pattern may include a plurality of first light transmitting portions discontinuously provided along a circumference of at least one closed loop among a plurality of closed loops and a plurality of first light reflecting portions in the central portion, and the second pattern may include a plurality of second light transmitting portions and a plurality of second light reflecting portions alternately provided with the plurality of second light transmitting portions in the edge portion.

The plurality of second light transmitting portions may be continuously provided along a circumference of at least one closed loop among a plurality of closed loops in the edge portion.

The plurality of second light transmitting portions may be continuously provided along a circumference of at least one closed loop among a plurality of closed loops in the edge portion.

The at least one light diffusion layer may include a first pattern in the central portion and a second pattern in the edge portion, the first pattern may include a plurality of first light transmitting portions discontinuously provided on a plurality of rows that cross each other, and a plurality of first light reflecting portions between the plurality of first light transmitting portions, and the second pattern may include a plurality of second light transmitting portions and a plurality of second light reflecting portions alternately provided with the plurality of second light transmitting portions.

The plurality of second light transmitting portions may be continuously provided along a circumference of at least one closed loop among a plurality of closed loops in the edge portion.

Thicknesses of the plurality of first light transmitting portions and the plurality of second light transmitting portions may be increased as being directed toward an outside of the light source corresponding portion.

In accordance with another aspect of the present inventive concept, a light diffusion plate configured to diffuse light emitted from a light source includes a body and at least one light diffusion layer. The at least one light diffusion layer may be provided on the body, having a light source corresponding portion corresponding to the light source, and formed with a pattern including a plurality of light transmitting portions and a plurality of light reflecting portions. A ratio of the plurality of light transmitting portions to the plurality of light reflecting portions at an edge portion of the light source corresponding portion may be larger than a ratio of the plurality of light transmitting portions to the plurality of light reflecting portions at a central portion of the light source corresponding portion.

A ratio of the plurality of light transmitting portions to the plurality of light reflecting portions may be increased as a distance from the central portion of the light source corresponding portion increases.

The plurality of light reflecting portions may be filled with white ink.

The plurality of the light reflecting portions may be more densely formed in the central portion of the light source corresponding portion than in the edge portion of the light source corresponding portion, and the plurality of the light transmitting portions may be more densely formed in the edge portion of the light source corresponding portion than in the central portion of the light source corresponding portion.

BRIEF DESCRIPTION OF THE DRAWINGS

These and/or other aspects of the inventive concept will become apparent and more readily appreciated from the following description of the embodiments, taken in conjunction with the accompanying drawings in which.

DETAILED DESCRIPTION

Figure 1:
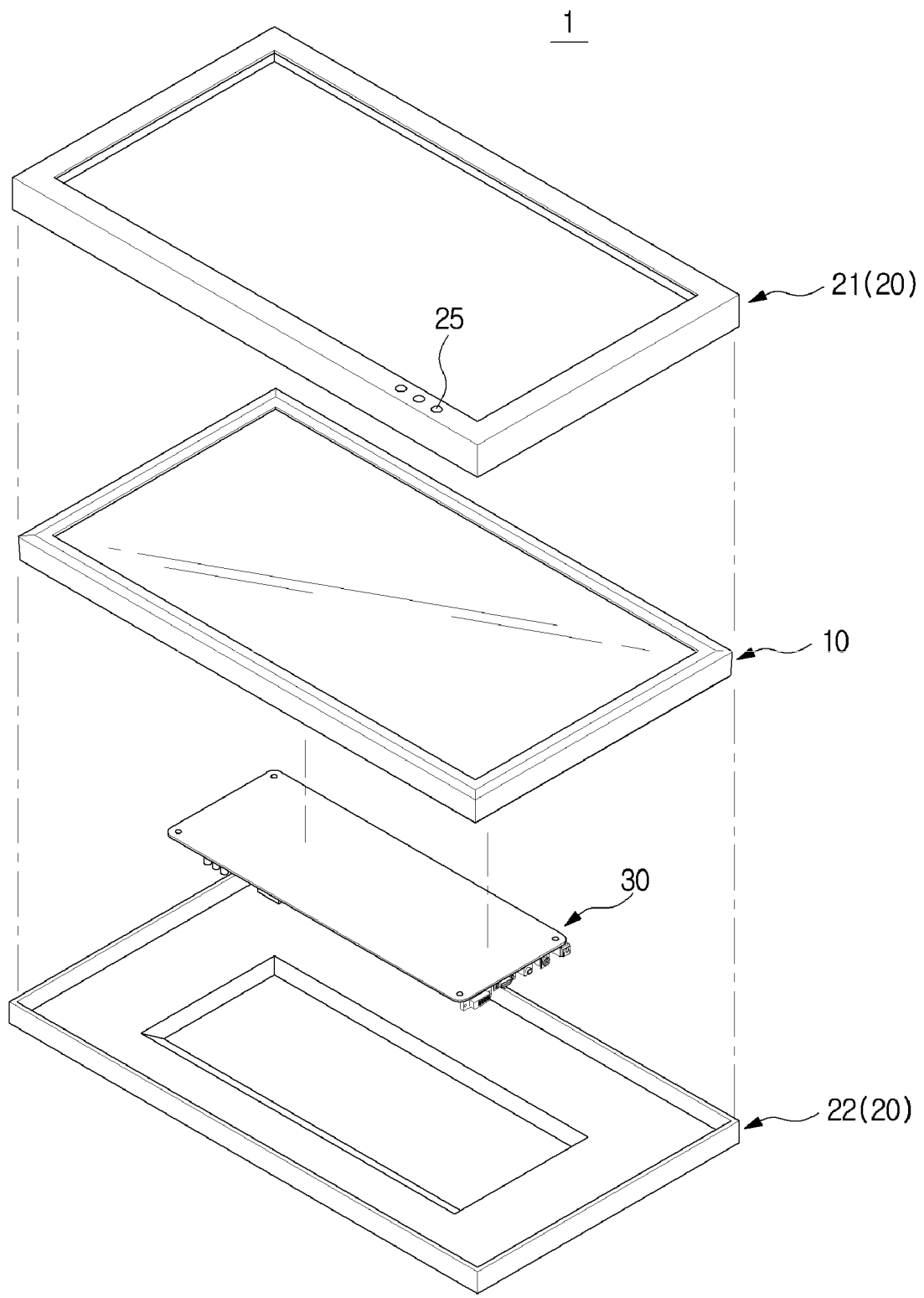
FIG. 1 is an exploded perspective view illustrating a display apparatus according to an exemplary embodiment.

Hereinafter, exemplary embodiments of the present inventive concept will be described in detail with reference to the accompanying drawings. Spatially relative terms, such as "beneath," "below," "lower," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly. The terminology used herein is for the purpose of describing particular embodiments only and is not intended to be limiting of the shape or position of each element.

A display apparatus 1 represents an apparatus that processes an image signal received from outside and visually displays the processed image. The display apparatus 1 may be implemented in various forms, such as a television (TV), a monitor, a portable multimedia apparatus, and a portable communication apparatus. The display apparatus 1 may be implemented in various apparatuses as long as it can visually display an image, and the form of the display apparatus 1 is not limited.

Hereinafter, like reference numerals refer to like elements throughout the disclosure.

FIG. 1 is an exploded perspective view illustrating a display apparatus according to an exemplary embodiment.

Referring to FIG. 1, the display apparatus 1 may further include a display module 10 on which an image is displayed. Details of the display module 10 will be described later.

The display apparatus 1 may further include a case 20 that forms an external appearance of the display apparatus 1.

The case 20 may include a front case 21 and a rear case 22 that are coupled to each other to accommodate the display module 10 therein.

The case 20 may be provided with various terminals providing connection with various external devices. In addition, a button and a switch receiving an input of an operation command from a user may be provided. For example, as illustrated in FIG. 1, an operation command input button 25 may be provided at the front case 21.

The display apparatus 1 may further include a control board 30 to transmit power and signals to the display module 10. The control board 30 may be disposed inside the case 20. In detail, the control board 30 may be disposed between the display module 10 and the rear case 22.

Figure 2:
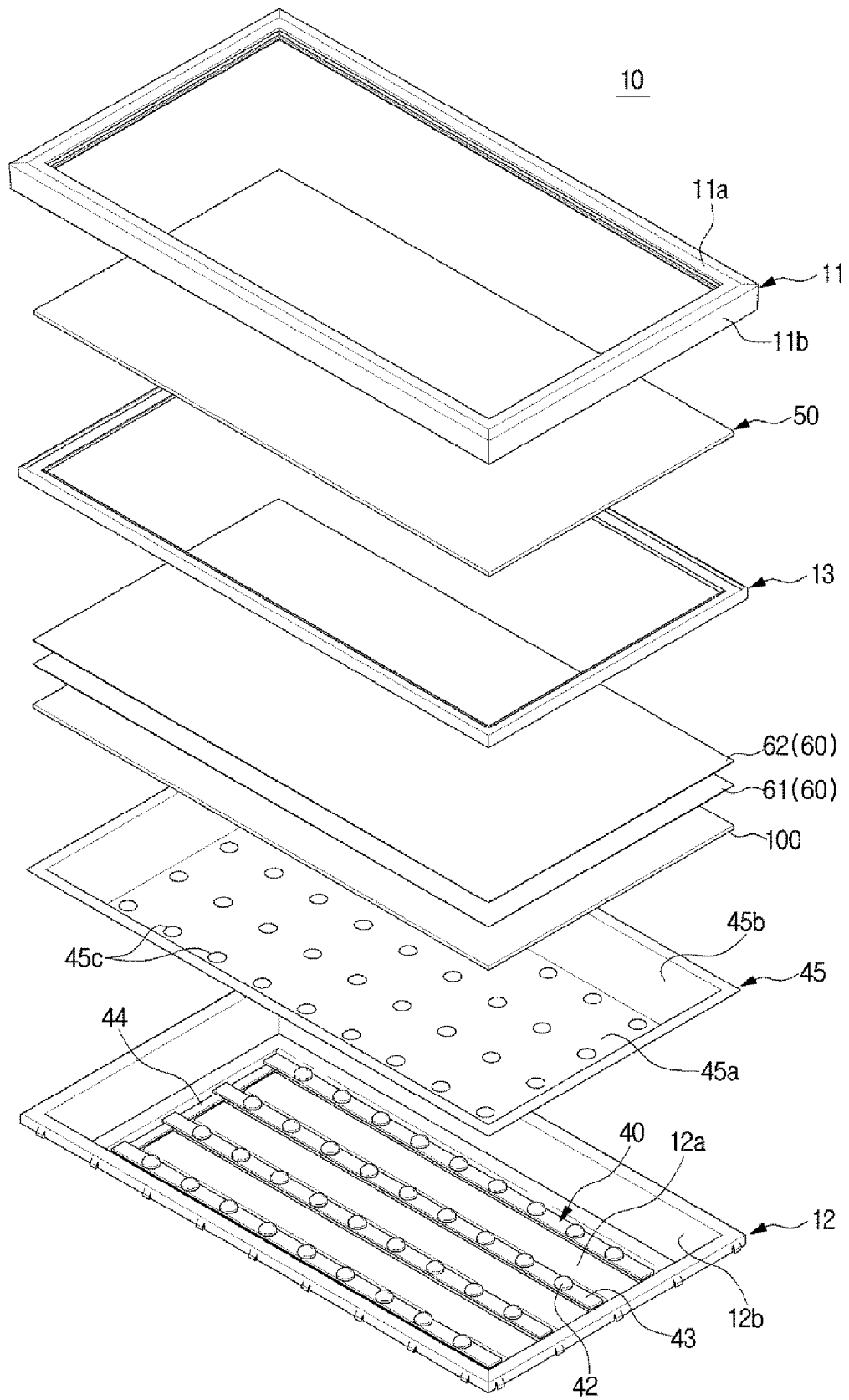
FIG. 2 is an exploded perspective view illustrating a display module of a display apparatus according to an exemplary embodiment.
Figure 3:
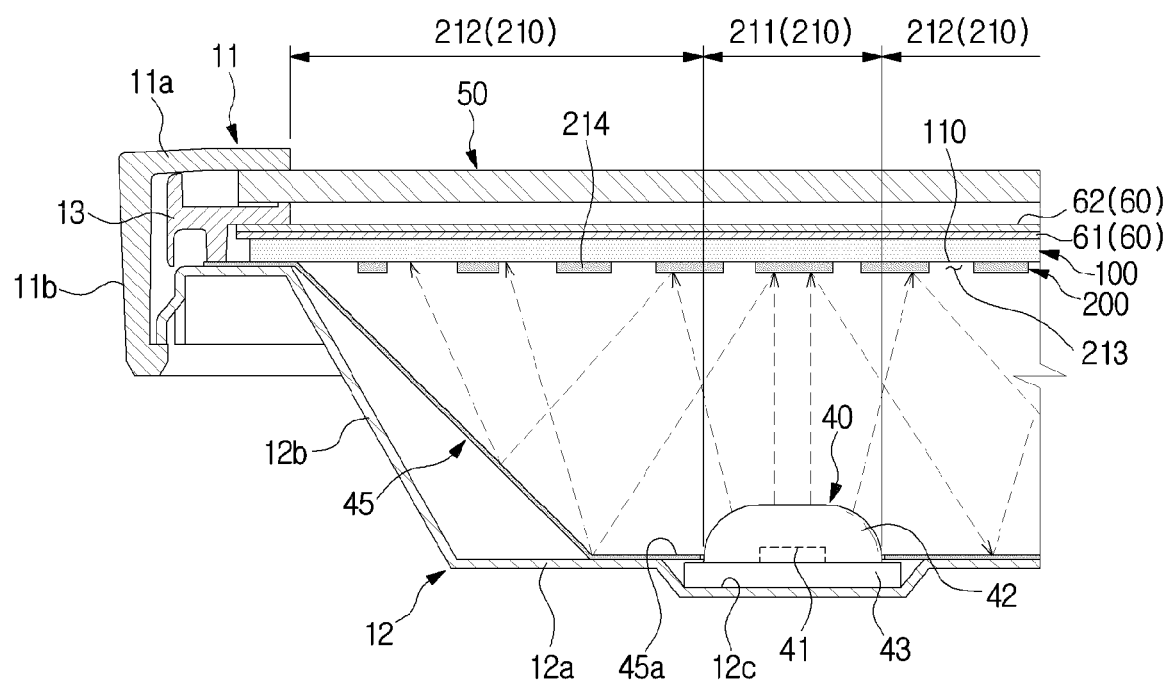
FIG. 3 is a cross sectional view illustrating a display module of a display apparatus according to an exemplary embodiment.

FIG. 2 is an exploded perspective view illustrating a display module of a display apparatus according to an exemplary embodiment, and FIG. 3 is a cross sectional view illustrating a display module of a display apparatus according to an exemplary embodiment.

Referring to FIGS. 2 and 3, the display module 10 includes a top chassis 11 provided at a front side of the display apparatus 1, a bottom chassis 12 provided at a rear side of the display apparatus 1, and a mold frame 13 provided inside the display apparatus 1.

The top chassis 11 is provided to prevent an edge portion of the display panel 20 from being exposed to an outside while forming the same surface as a display panel 50, on which an image is displayed. The top chassis 11 may include a bezel portion 11a covering a front surface of a periphery of the display panel 50, and a top side surface portion 11b bent rearward from a periphery of the bezel portion 11a.

The bottom chassis 12 may be provided at a side opposite the display panel 50 to prevent various kinds of structural elements included in the display apparatus 1 from being exposed to the outside, and protect the various structural elements included in the display apparatus 1 from an external shock. A backlight unit 40 may be installed on the bottom chassis 12. The bottom chassis 12 may be provided in an approximately rectangular shape, but the shape of the bottom chassis 12 is not limited thereto. The bottom chassis 12 may include a bottom rear portion 12a on which the backlight unit 40 is positioned and a bottom side portion 12b extending forward from a periphery of the bottom rear portion 12a. The bottom rear portion 12a may have a seating groove 12c which is recessed so that a circuit board 43 of the backlight unit 40 is positioned in the seating groove 12c.

The mold frame 13 may be provided to support the display panel 50 and a light diffusion plate 100. The mold frame 13 may support the display panel 50 disposed in front of the mold frame 13 and the light diffusion plate 100 disposed behind the mold frame 13. The top chassis 11 may be installed in front of the mold frame 13 to position the display panel 50 on the mold frame 13. The bottom chassis 12 may be installed behind the mold frame 13.

The display module 10 may include the display panel 50. A screen may be provided on the display panel 50. A screen may be provided on the display panel 50. The display panel 50 may display various images on the screen according to an image signal being input from the outside. In this case, the display panel 50 may be an emissive display panel that generates an image as a plurality of pixels forming the display panel 50 emit light by themselves or a non-emissive display panel that generates an image as a plurality of pixels reflect/transmit/block light. Hereinafter, the following description will be made on the assumption that the display panel 50 is a non-emissive display panel that generates an image by reflecting/transmitting/blocking light emitted from the backlight unit.

The display panel 50 may include a liquid crystal layer, a transparent electrode layer, a transparent substrate and a color filter that are not shown in the drawing.

The liquid crystal layer may contain an adequate amount of liquid crystal. The liquid crystal means an intermediate phase of crystal and liquid. Such liquid crystal may exhibit an optical property according to a change of a voltage. For example, the arrangement direction of molecules constituting the liquid crystal may be changed according to a change of an electric field applied to the liquid crystal.

A pair of transparent electrode layers are provided at both sides of the liquid crystal layer for forming a varying electric field on the liquid crystal layer. The electric field applied to the liquid crystal layer is changed according to the voltage applied between the pair of transparent electrode layers. The transparent electrode layer may include a gate line, a data line, and a thin film transistor (TFT) that are not shown in the drawing.

A pair of transparent substrates (not shown) form an external appearance of the display panel 50 and protect the liquid crystal layer and the transparent electrode layer. Such transparent substrates may be formed of tempered glass or a transparent film having an excellent light transmittance.

The color filter (not shown) array may include a red color filter, a blue color filter, and a green color filter formed on areas corresponding to the pixels, respectively, so as to allow each of the plurality of pixels constituting the display panel 50 to show the colors.

As described above, the display panel 50 may generate an image by blocking or transmitting the light emitted from the backlight unit 40. Specifically, each of the pixels constituting the display panel 50 blocks or transmits the light of the backlight unit 40 to generate the image having various colors.

The display module 10 may further include the back light unit 40 to supply the display panel 50 with light. The back light unit 40 may be disposed behind the display panel 50.

The backlight unit 40 may include a plurality of light sources 41 emitting light. The plurality of light sources 41 may be elements configured to emit light. The plurality of light sources 41 may include elements and devices that generate and emit light, as well as light emitting diodes (LEDs). The plurality of light sources 41 may be installed at a front surface of the circuit board 43 so as to face the light diffusion plate 100. In addition, the plurality of light sources 41 may emit light toward the display panel 50.

In addition, the backlight unit 40 may further include a plurality of lens 42 surrounding the plurality of light sources 41, respectively. The plurality of lens 42 may be installed on the plurality of light sources 41 to diffuse light generated from the plurality of light sources 41. The plurality of lens 42 may be provided in a circular shape, but the shape of the plurality of lens 42 may be variously provided. The plurality of lens 42 may be implemented by material having a light transmitting property. For example, the plurality of lens 42 may be implemented by one or the combination of polycarbonate (PC), poly methyl methacrylate (PMMA), and acrylic. The material forming the plurality of lens 42 is not limited and may be implemented by various materials (e.g., a glass material).

In addition, the backlight unit 40 may further include the circuit board 43 to which the plurality of light sources 41 are mounted. The circuit board 43 may include at least one of a printed circuit board and a Flexible Copper Clad Laminate.

The circuit board 43 may be disposed on the bottom chassis 12. The circuit board 43 may be elongated in one direction corresponding to the display panel 50. In the circuit board 43, a conductive pattern may be formed. The plurality of light sources 41 and the circuit board 43 may be electrically connected to each other by wire bonding or flip-chip bonding.

The backlight unit 40 may include a plurality of circuit boards 43 that are spaced apart from each other in parallel to each other. At each of the circuit boards 43, the plurality of light sources 41 and the plurality of lens 42 installed at the plurality of light sources 41, respectively, are arranged lengthwise along the plurality of circuit boards 43 while being spaced apart from each other. The plurality of circuit boards 43 may be connected to each other through a connection board 44.

In addition, the backlight unit 40 may further include a reflector sheet 45 that is disposed on the rear side of the circuit board 43. The reflector sheet 45 may be disposed on the inner surface of the bottom chassis 12. The reflector sheet 45 may reflect light emitted to the inner surface of the bottom chassis 12 toward the display panel 50.

The reflector sheet 45 includes a sheet rear portion 45a disposed at the inner surface of the bottom rear portion 12a forming the rear surface of the bottom chassis 12 and a sheet side portion 45b extending forward from a periphery of the sheet rear portion 45a.

The sheet rear portion 45a is provided with holes 45c. In detail, the holes 45c may be provided at the sheet rear portion 45a to correspond to each of the light sources 41 and the lenses 42. The LEDs 41 and the lenses 42 protrude through the holes 45c of the reflector 45. The light generated by the light sources 41 is delivered to the display panel 50 that is disposed at a front side of the reflector sheet 45, and light reflected in a rearward direction by the light diffusion plate 100 or the like is reflected in the forward direction by the reflector sheet 45.

The sheet side portion 45b extends forward from the periphery of the sheet rear portion 45a, namely from up-down-left-right tips of the sheet rear portion 45a, and is obliquely formed. Consequently, a light emitted by the light sources 41 and incident on the sheet side portion 45b may be reflected toward the display panel 50. Since the light diffusion plate 100 is disposed behind the display panel 50, the sheet side portion 45b is obliquely formed to face the rear surface of the light diffusion plate 100.

In addition, the backlight unit 40 may further include a quantum dot sheet (not shown) receiving the light from the plurality of light sources 41 and outputting a white light in which various color lights are mixed.

The display module 10 may further include the light diffusion plate 100 that allows light emitted from the backlight unit 40 to be diffused and transmitted to the display panel 50. The light diffusion plate 100 may be disposed behind the display panel 50. Details of the light diffusion plate 100 will be described later.

The display module 10 may further include an optical sheet 60 that is disposed on the front surface of the light diffusion plate 100. The optical sheet 60 may be positioned on the front surface of the light diffusion plate 100. The optical sheet 60 may include a prism film 61 to concentrate light diffused by the light diffusion plate 100 in a direction perpendicular to the display panel 50, and the optical sheet 60 may include a protective film 62 to protect the prism film 61. The protective film 62 may be provided on the front surface of the prism film 61. The protection film 62 may protect a variety of components constituting the backlight unit 40 from an external impact, and prevent foreign materials from being introduced into the variety of components constituting the backlight unit 40. Particularly, because a scratch easily occurs in the prism film 61, the protection film 62 may be provided on the front surface of the prism film 61 so that it may be possible to prevent the scratch from occurring in the prism film 61. The optical sheet 60 may further include a double brightness enhancement film (not shown). The double brightness enhancement film may be provided on the front surface of the protection film 62. The double brightness enhancement film is also referred to as a reflective polarizing film that is a kind of a polarizing film. The double brightness enhancement film may transmit a polarized light in parallel with a polarization direction of the double brightness enhancement film, among lights emitted from the backlight unit 40, and may reflect a light in a different direction from the polarization direction of the double brightness enhancement film. The reflected light may be recycled back to the backlight unit 40 so as to improve the luminance of the display apparatus 1.

Hereinafter, the light diffusion plate 100 will be described in detail.

The light diffusion plate 100 may be disposed between the display panel 50 and the plurality of light sources 41 to diffuse light emitted from the plurality of light sources 41 to be guided toward the display panel 50.

The display module 10 may further include at least one light diffusion layer 200 provided on the light diffusion plate 100.

The at least one light diffusion layer 200 may be provided on an incident surface 110 of the light diffusion plate 100 onto which light emitted from the plurality of light sources 41 is incident.

The at least one light diffusion layer 200 may be integrally formed with the light diffusion plate 100. In detail, the at least one light diffusion layer 200 may be integrally formed with the incident surface 110 of the light diffusion plate 100. In other words, the at least one light diffusion layer 200 may be formed directly on at least one surface of the light diffusion plate 100.

The at least one light diffusion layer 200 may include a light source corresponding portion 210 corresponding to the plurality of light sources 41. The light source corresponding portion 210 may include a central portion 211 and an edge portion 212 surrounding the central portion 211. The central portion 211 represents a portion, onto which light is emitted from the plurality of light sources 41, of the light source corresponding portion 210, (hereinafter, referred to as the center C of the light source corresponding portion 210) and an adjacent portion thereto.

The at least one light diffusion layer 200 may further include a plurality of light transmitting portions 213. The plurality of light transmitting portions 213 may be provided in the light source corresponding portion 210. The density of the plurality of light transmitting portions 213 in the edge portion 212 of the light corresponding portion 210 may be higher than in the central portion 211 of the light corresponding portion 210. The density of the plurality of light transmitting portions 213 may be increased as a distance from the central portion 211 of the light source corresponding portion 210 increases.

The at least one light diffusion layer 200 may further include a plurality of light reflecting portions 214. The plurality of light reflecting portions 214 may be formed in the light source corresponding portion 210. The density of the plurality of light reflecting portions 214 in the central portion 211 of the light corresponding portion 210 may be higher than in the edge portion 212 of the light corresponding portion 210. The density of the plurality of light reflecting portions 214 may be decreased as a distance from the central portion 211 of the light source corresponding portion 210 increases. That is, the density of the plurality of light reflecting portion 214 and the density of the plurality of light transmitting portions 213 may be inversely related to each other. The plurality of light reflecting portions 214 may be formed between the plurality of light transmitting portions 213. In addition, the plurality of light reflecting portions 214 may be filled with white ink. The plurality of light reflecting portions 214 are filled with white ink since a color of white exhibits the most superior reflexibility. The plurality of light reflecting portions 214 may be patterned on the light diffusion plate 100. According to an example of the patterning, the plurality of light reflecting portions 214 may be formed on the light diffusion plate 100 through a printing and an exposure.

From the perspective of the light diffusion plate 100, the light diffusion plate 100 may include a body (not shown) and the at least one light diffusion layer 200 provided on the body. On the at least one light diffusion layer 200, a pattern including the plurality of light transmitting portions 213 and the plurality of light reflecting portions 214 may be formed. A ratio of the plurality of light transmitting portions 213 to the plurality of light reflecting portions 214 in the edge portion 212 of the light source corresponding portion 210 may be larger than a ratio of the plurality of light transmitting portions 213 to the plurality of light reflecting portions 214 in the central portion 211 of the light source corresponding portion 210. The ratio of the plurality of light transmitting portions 213 to the plurality of light reflecting portions 214 may be increased as a distance from the central portion 211 of the light source corresponding portion 210 increases.

On the display panel 50, a mura may occur due to non-uniform brightness. In general, a portion corresponding to the plurality of light sources 41 has a high brightness. In order to prevent such a non-uniform brightness, the distance between the plurality of light sources 41 and the light diffusion plate 100 may be increased, or the number of light sources 41 may be increased. However, the increased distance between the plurality of light sources 41 and the light diffusion plate 100 may result in a difficulty implementing a slimness of the display apparatus 1. In addition, the more the light sources 41 are installed, the higher manufacturing cost is required. According to the present inventive concept, the at least one light diffusion layer 200 including the plurality of light transmitting portions 213 and the plurality of light reflecting portions are provided on the light diffusion plate 100, thereby implementing the display apparatus 1 satisfying a uniform brightness and a slim design. In detail, the plurality of light reflecting portions 214 are densely formed in the central portion 211 of the light source corresponding portion 210, and the plurality of light transmitting portions 213 may be densely formed in the edge portion 212 of the light source corresponding portion 210, so that light generated from the plurality of light sources 41 is uniformly distributed over the entire surface of the display panel 50. In addition, light is recycled between the plurality of light sources 41 and the light diffusion plate 100 through the reflection, so that a sufficient length of light travel path is ensured. Accordingly, the display apparatus 1 is made to have a slim design.

The following description will be made in relation to various patterns that may be formed on the at least one light diffusion layer 200 by the plurality of light transmitting portions 213 and the plurality of light reflecting portions 214.

FIGS. 4A to 4K are views illustrating various patterns that may be formed on the light diffusion plate of the display apparatus according to an exemplary embodiment of the present inventive concept. In the following description, details of elements or operations identical to those described with reference to FIGS. 4A to 4K will be omitted.

Figure 4A:
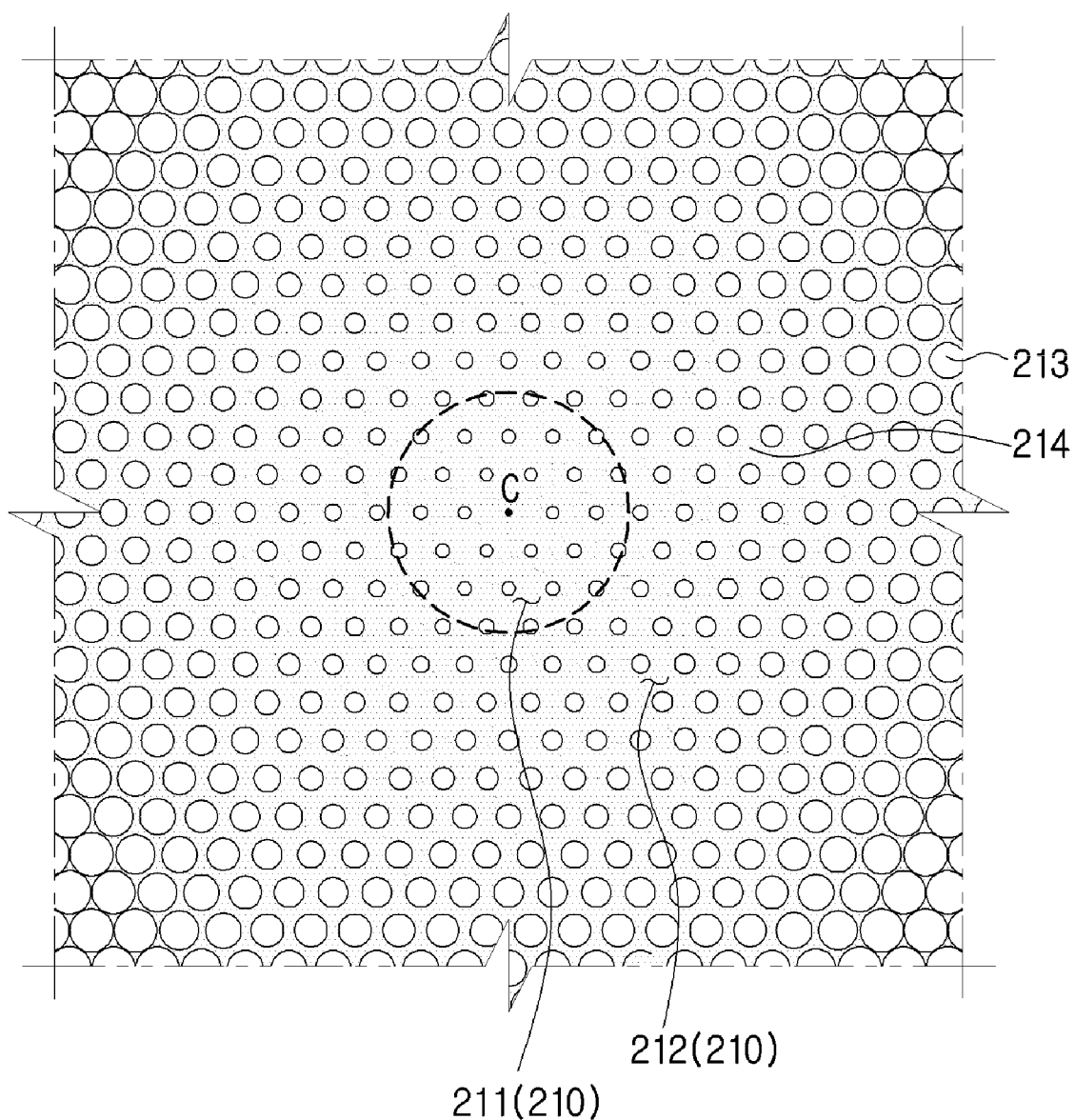
FIGS. 4A to 4K are views illustrating various patterns that are formed on a light diffusion plate of a display apparatus according to an exemplary embodiment.
Figure 4B:
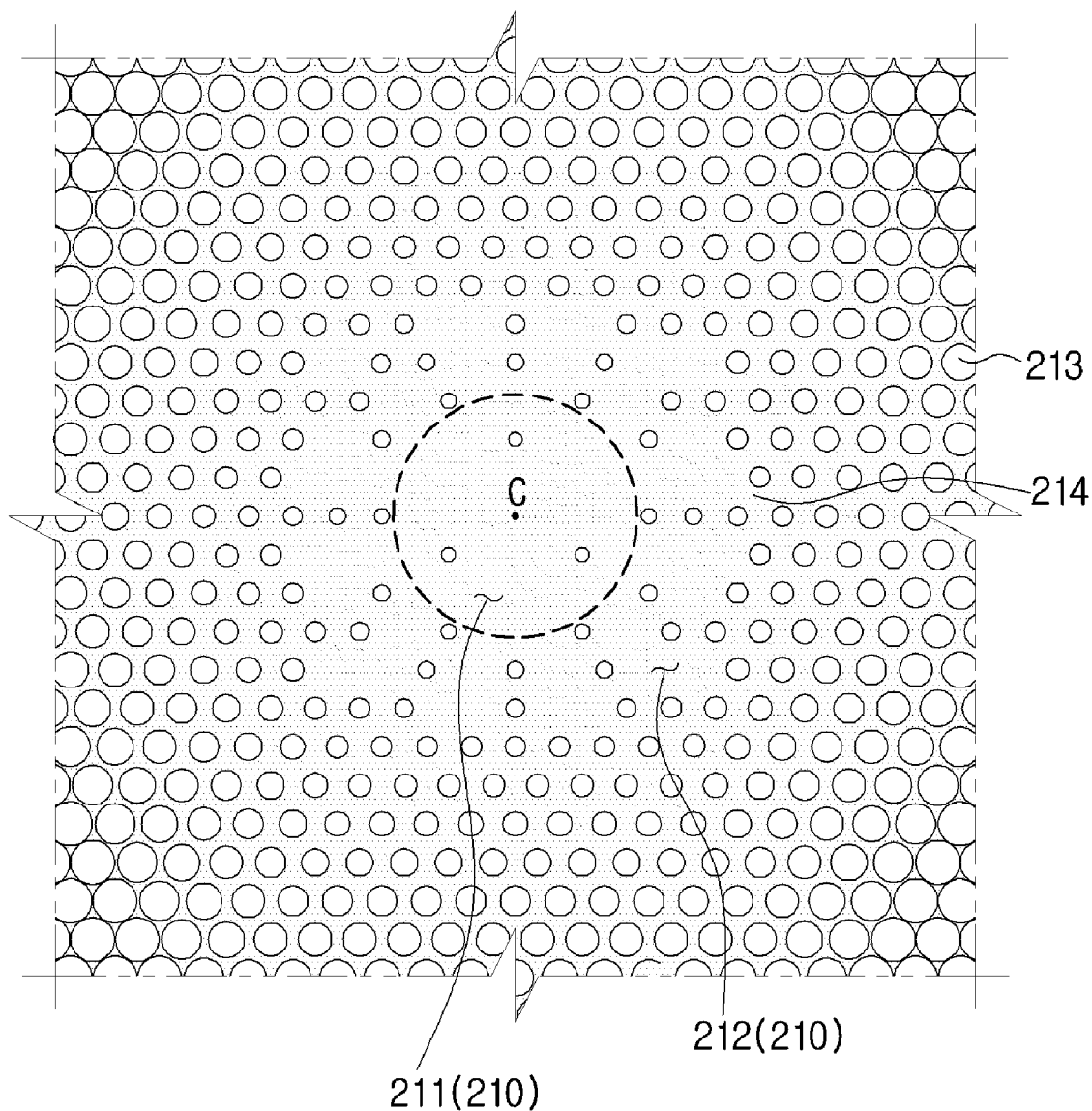

Referring to FIGS. 4A and 4B, the plurality of light reflecting portions 214 may be densely formed in the central portion 211 of the light source corresponding portion 210, and the plurality of light transmitting portions 213 may be densely formed in the edge portion 212 of the light source corresponding portion 210.

Sizes of the plurality of light transmitting portions 213 in the central portion 211 of the light source corresponding portion 210 may be smaller than sizes of the plurality of light transmitting portions 213 in the edge portion 212 of the light source corresponding portion 210. The sizes of the plurality of light transmitting portions 213 may be increased as a distance from the central portion 211 of the light source corresponding portion 210 increases.

Intervals between the plurality of light transmitting portions 213 in the edge portion 212 of the light source corresponding portion 210 may be smaller than intervals between the plurality of light transmitting portions 213 in the central portion 211 of the light source corresponding portion 210. Interval between the plurality of light transmitting portions 213 may be decreased as a distance from the central portion 211 to the edge portion 212 of the light source corresponding portion 210 increases.

Figure 4C:
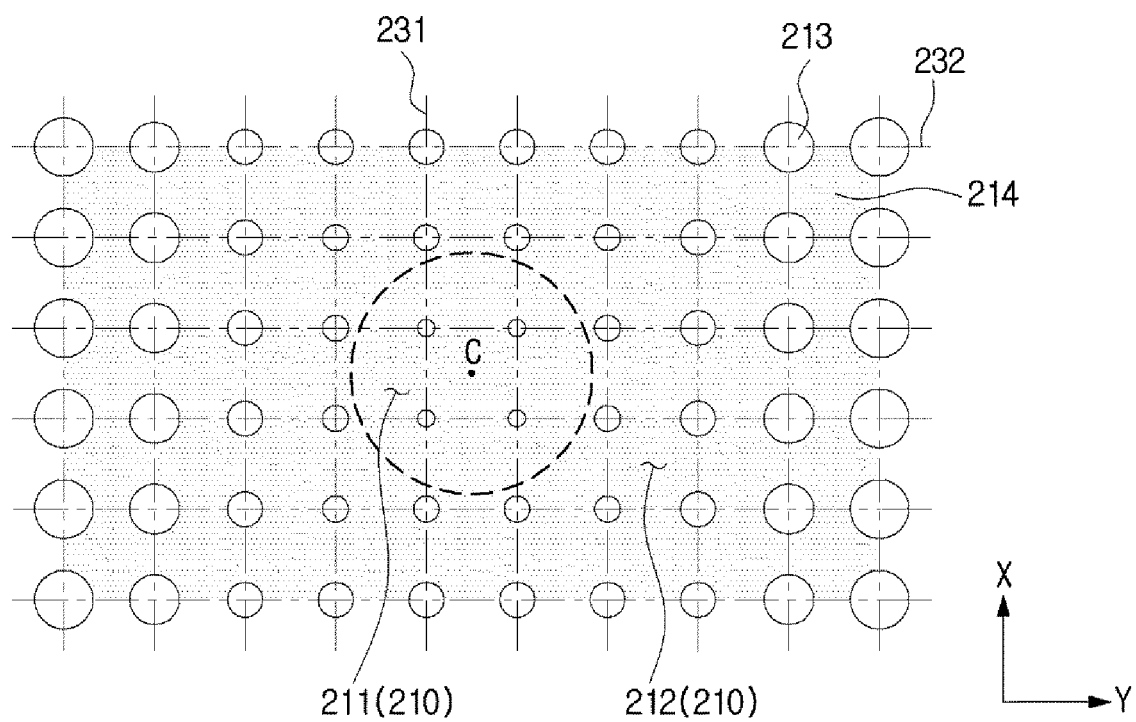

Referring to FIG. 4C, the light source corresponding portion 210 may include a plurality of first rows 231 and a plurality of second rows 232. The plurality of first rows 231 may be arranged in a first direction (X). The plurality of second rows 232 may be arranged in a second direction (Y). The plurality of second rows 232 may form a plurality of intersections by crossing the plurality of first rows 231. For example, the plurality of second rows 232 may cross the plurality of first rows 231 at right angles to the plurality of first rows 231. The plurality of light transmitting portions 213 may be formed on the plurality of intersections. Sizes of the plurality of light transmitting portions 213 formed along at least one of the plurality of first rows 231 and the plurality of second rows 232 may be increased as a distance from the central portion 211 of the light source corresponding portion 210 increases.

Figure 4D:
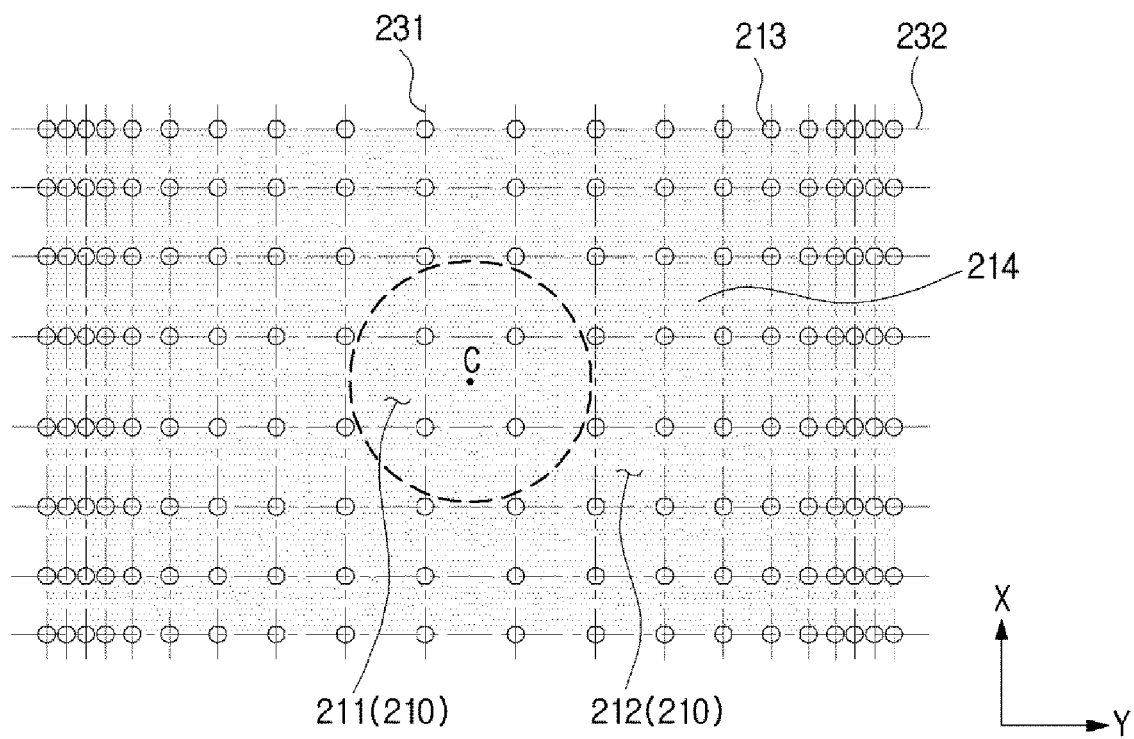

Referring to FIG. 4D, at least one of an interval of the plurality of first rows 231 and an interval of the plurality of second rows 232 may be decreased as a distance from the central portion 211 of the light source corresponding portion 210 increases. In other words, a distance between light transmitting portions 213 adjacent to each other among the plurality of light transmitting portions 213 may be decreased as a distance from the central portion 211 of the light source corresponding portion 210 increases.

Figure 4E:
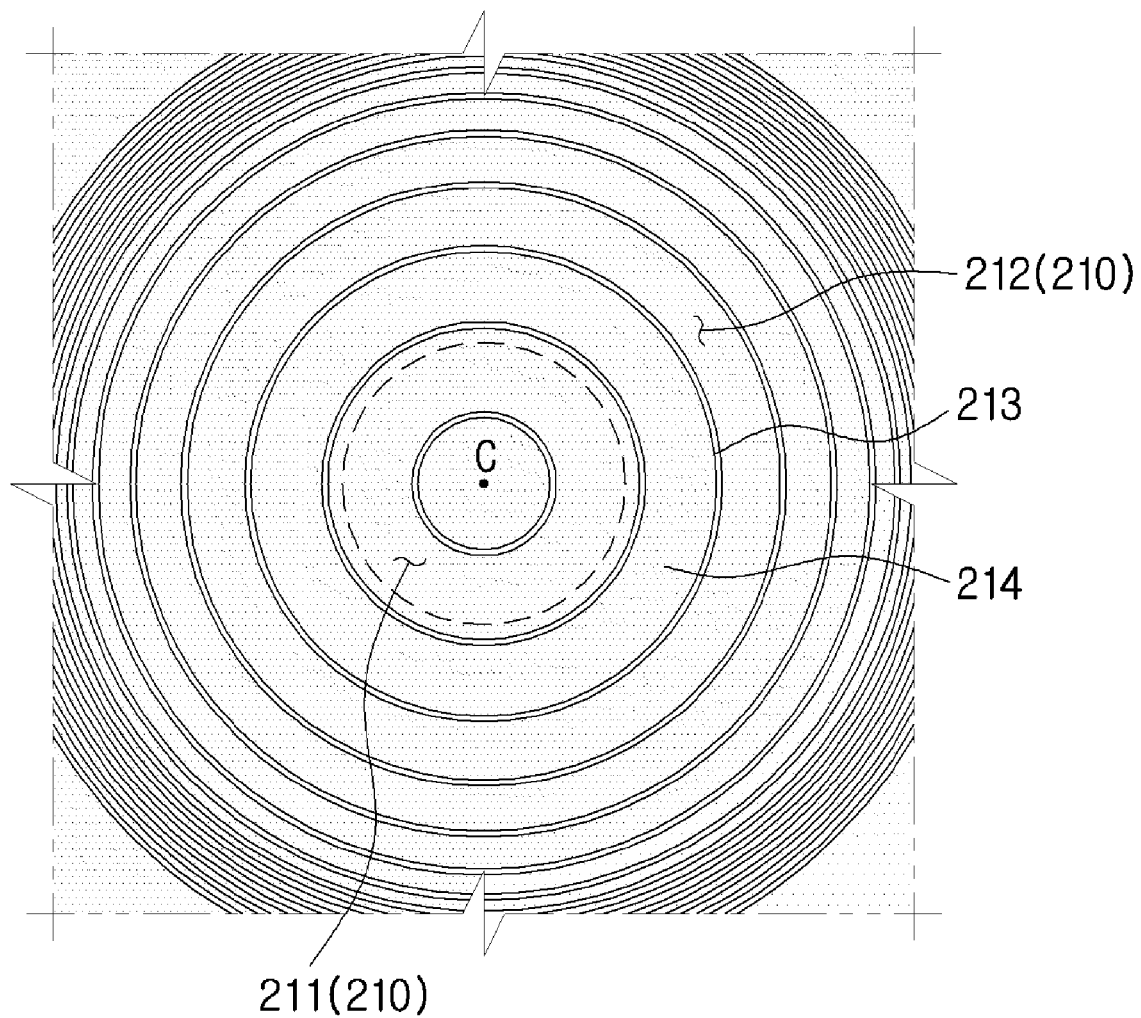
Figure 4F:
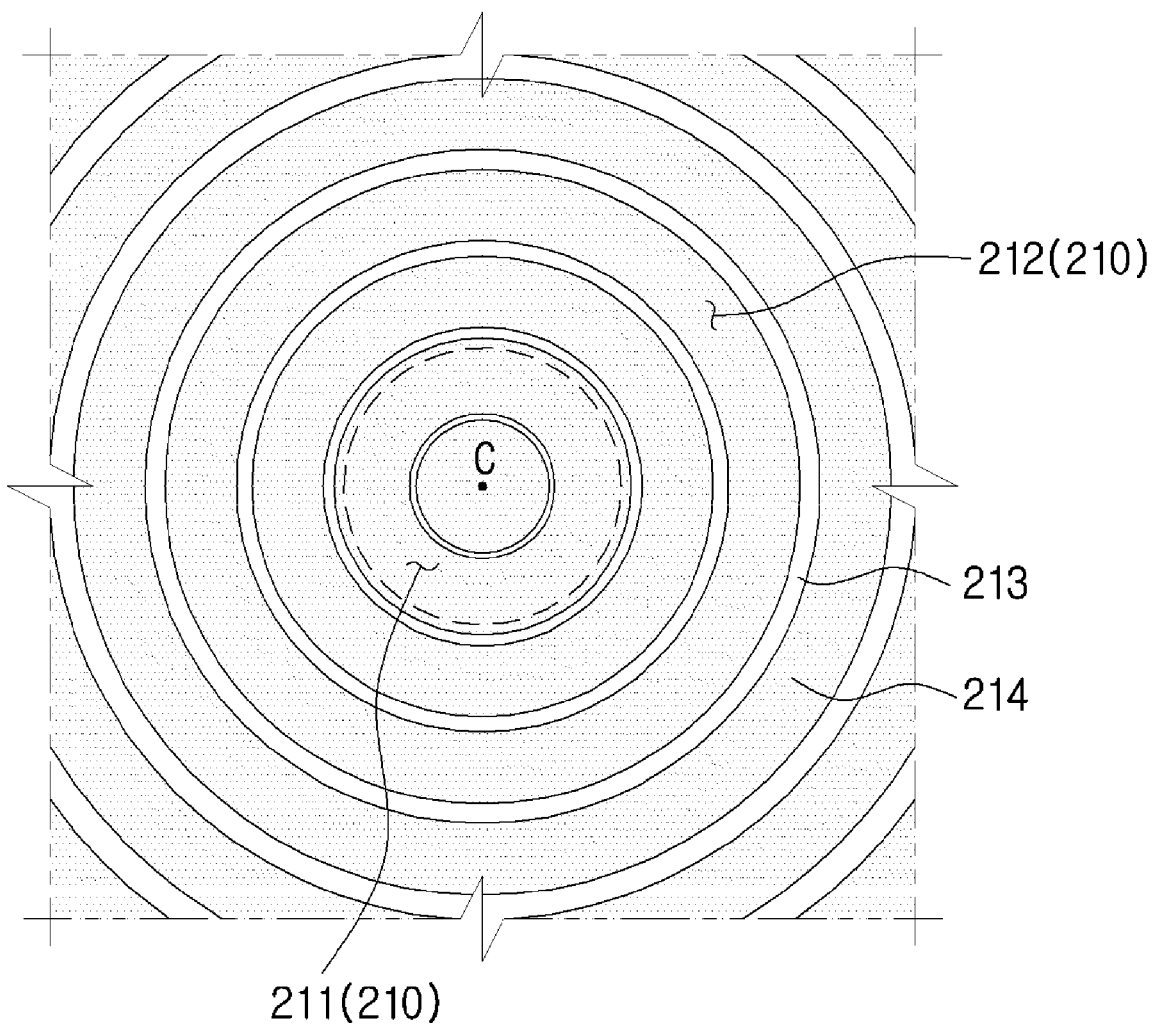
Figure 4G:
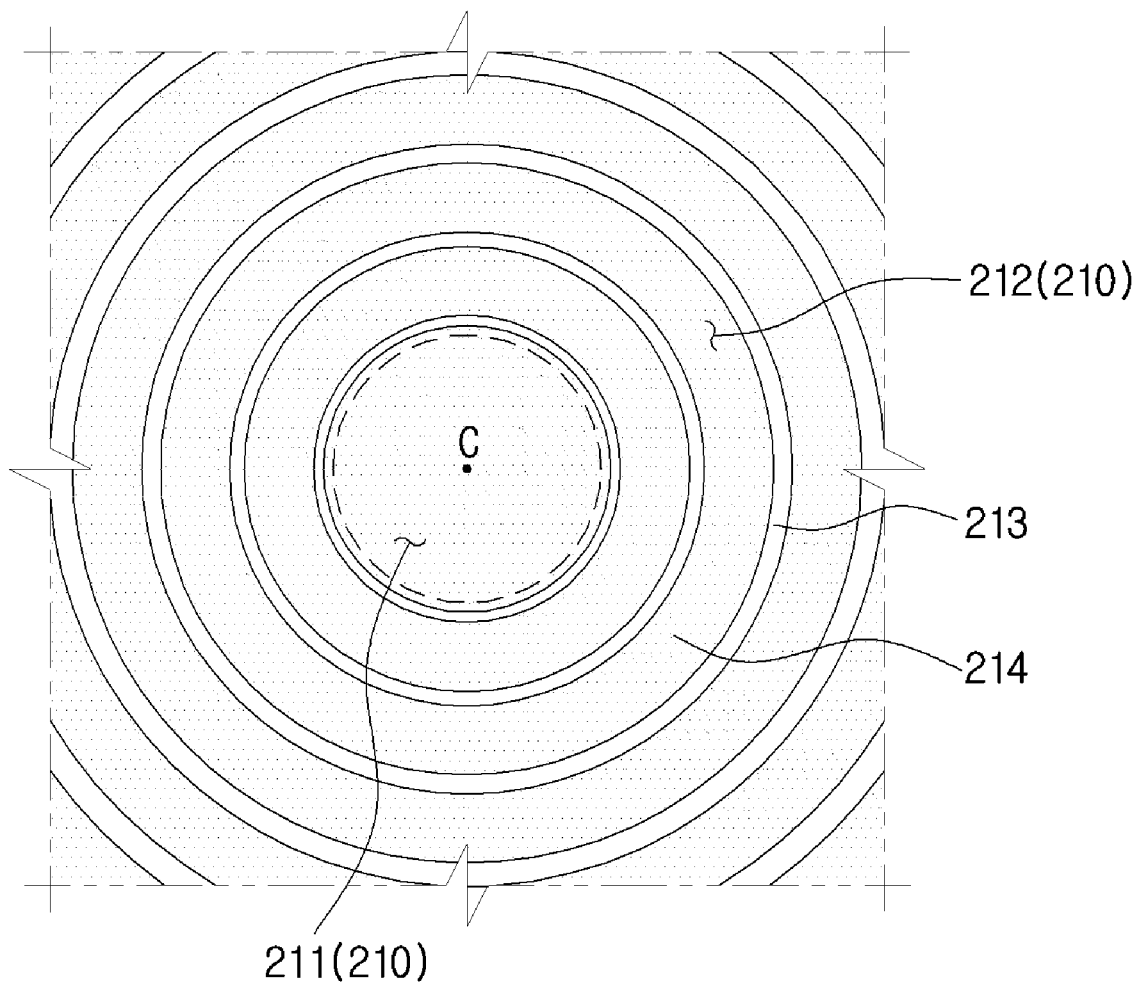

Referring to FIGS. 4E to 4G, the plurality of light transmitting portions 213 are formed around a circumference of the central portion 211 of the light source corresponding portion 210, with each of the light transmitting portions 213 being larger than an adjacent light transmitting portion disposed in a direction toward the central portion 211 of the light source corresponding portion 210. The plurality of light transmitting portions 213 may include a closed loop shape. The closed loop shape may include a circular shape and a polygonal shape. In detail, FIGS. 4E to 4G illustrate a circular shape as the closed loop shape, and FIGS. 4J to 4K illustrate a hexagonal shape as the closed loop shape. The closed loop shape is not limited thereto, and may be provided in various shapes corresponding to the form of the plurality of light sources 41.

Referring to FIG. 4E, the plurality of light transmitting portions 213 may include circular shapes, each circular shape being larger than an adjacent circular shape disposed in a direction toward the central portion 211 of the light source corresponding portion 210. For example, the plurality of light transmitting portions 213 may include a concentric circular shape formed along the central portion 211 of the light source corresponding portion 210. The center of the concentric circle is identical to the center C of the light source corresponding portion 210.

Intervals of light transmitting portions 213 adjacent to each other in the edge portion 212 of the light source corresponding portion 210 among the plurality of light transmitting portions 213 are narrower than intervals of light transmitting portions 213 adjacent to each other in the central portion 211 of the light source corresponding portion 210 among the plurality of light transmitting portions 213. In other words, the plurality of light transmitting portions 213 may be more densely formed in the edge portion 212 of the light source corresponding portion 210 compared to the central portion 211 of the light source corresponding portion 210. Interval of light transmitting portions 213 adjacent to each other among the plurality of light transmitting portions 213 may be decreased as a distance from the central portion 211 of the light source corresponding portion 210 increases.

Referring to FIG. 4F, the plurality of light transmitting portions 213 may include circular shapes, each circular shape being larger than an adjacent circular shape disposed in a direction toward the central portion 211 of the light source corresponding portion 210. For example, the plurality of light transmitting portions 213 may include a concentric shape formed along the central portion 211 of the light source corresponding portion 210. In this case, the center of the concentric circle is identical to the center C of the light source corresponding portion 210.

Thicknesses of the plurality of light transmitting portions 213 in the edge portion 212 of the light source corresponding portion 210 may be greater than those of the plurality of light transmitting portions 213 in the central portion 211 of the light source corresponding portion 210. The thicknesses of the plurality of light transmitting portions 213 may be increased as a distance from the central portion 211 of the light source corresponding portion 210 increases. That is, even with the same interval of adjacent light transmitting portions 213, the light transmitting portions 213 may be provided to have a higher density in the edge portion 212 of the light source corresponding portion 210 by increasing the thicknesses of the light transmitting portions 213 as a distance from the central portion 211 of the light corresponding portion 210 increases.

Referring to FIG. 4G, thicknesses of the plurality of light transmitting portions 213 in the edge portion 212 of the light source corresponding portion 210 may be greater than those of the plurality of light transmitting portions 213 in the central portion 211 of the light source corresponding portion 210. The thicknesses of the plurality of light transmitting portions 213 may be increased as a distance from the central portion 211 of the light source corresponding portion 210 increases.

In the central portion 211 of the light source corresponding portion 210, the plurality of light reflecting portions 214 may be provided, and in the edge portion 212 of the light source corresponding portion 210, the plurality of light transmitting portions 213 and the light reflecting portions 214 are provided. As shown in FIG. 4F, the plurality of light transmitting portions 213 may be provided at an inside of the central portion 211 of the light source corresponding portion 210 along a circumference of the central portion 211 of the light source corresponding portion 210. As shown in FIG. 4G, the plurality of light transmitting portions 213 may be provided at an outside of the central portion 211 of the light source corresponding portion 210 along a circumference of the central portion 211 of the light source corresponding portion 210, and in the central portion of the light source corresponding portion 210, only the plurality of light reflecting portions 214 may be provided.

Figure 4H:
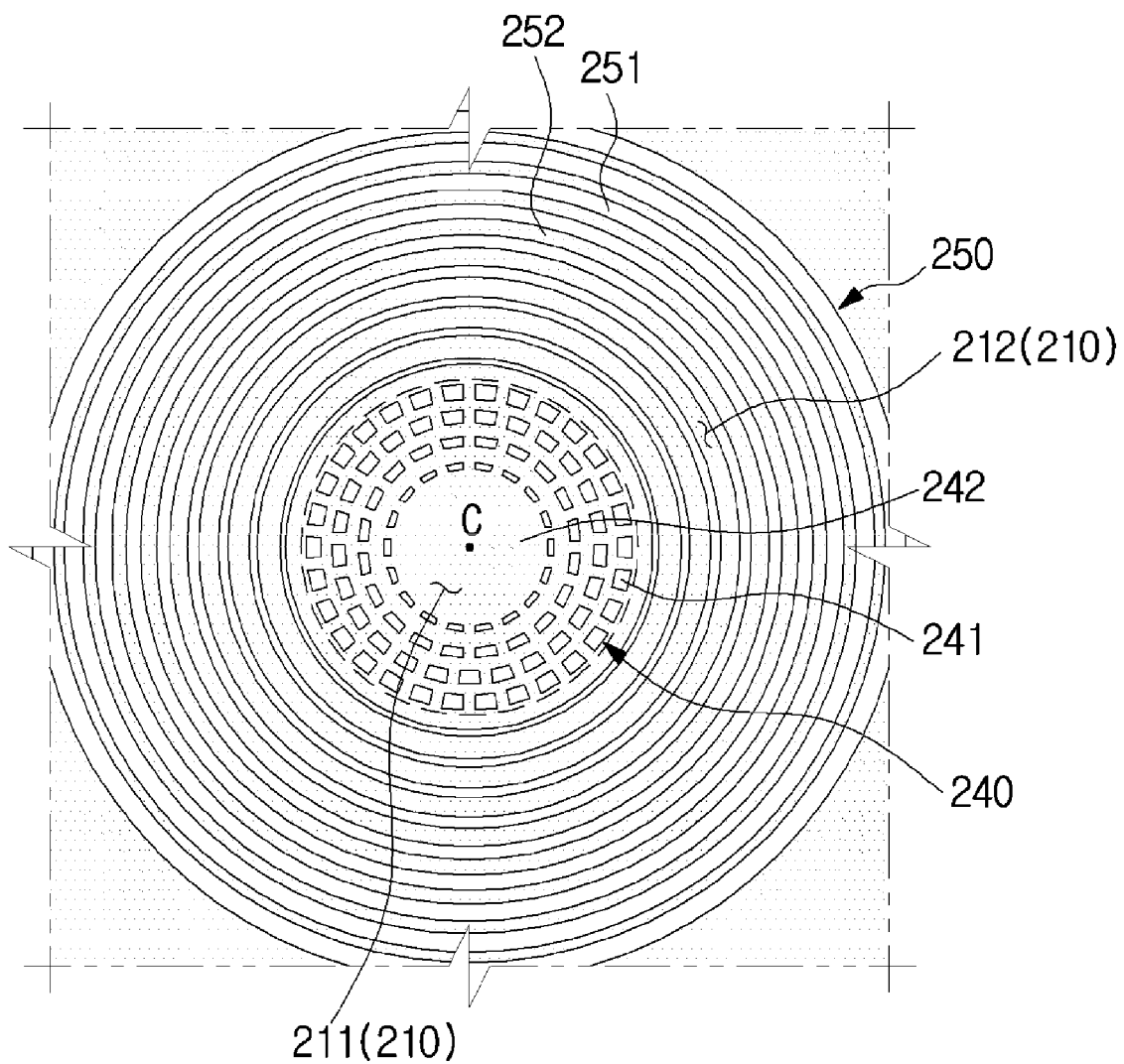
Figure 4I:
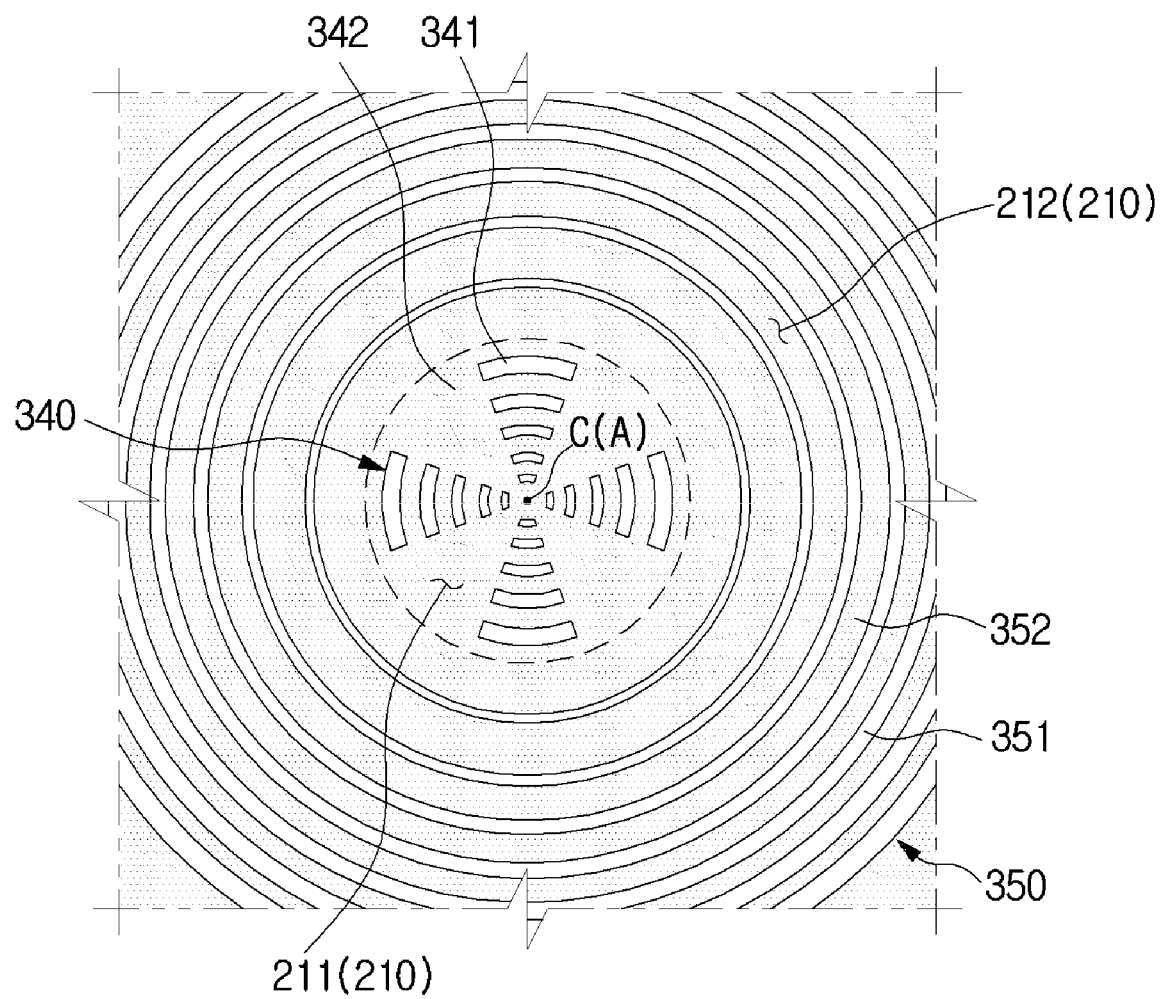
Figure 4J:
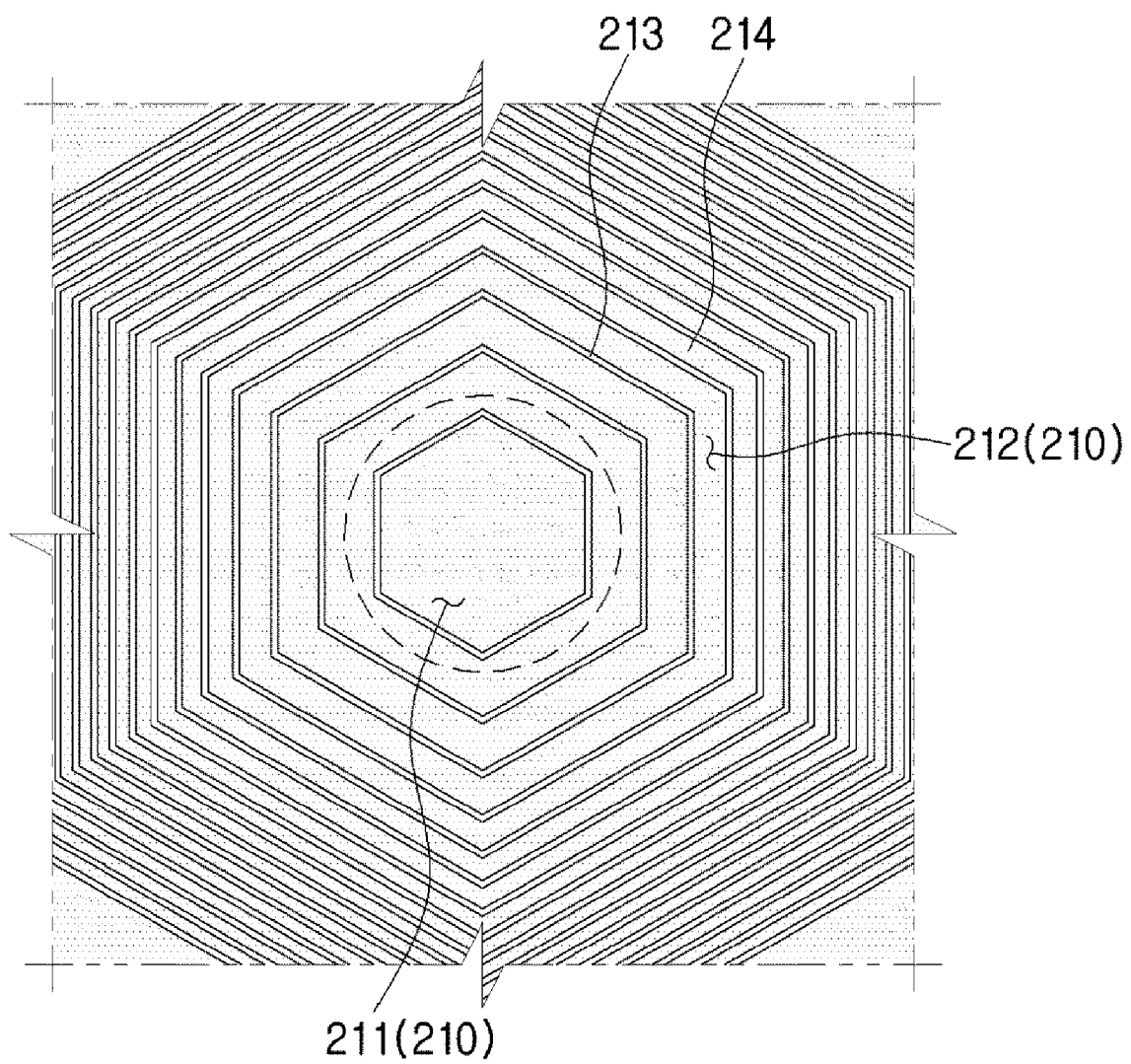
Figure 4K:
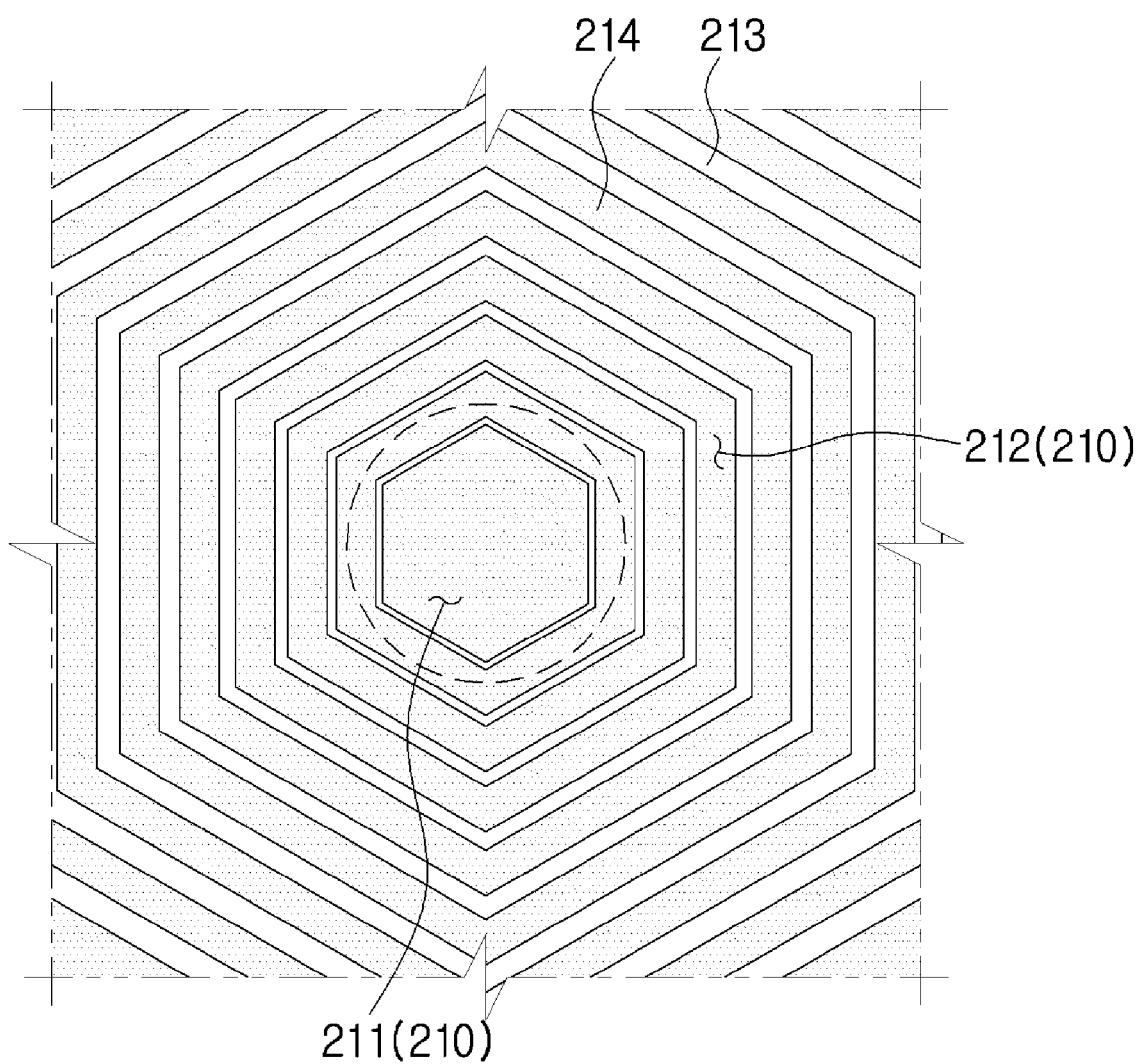

Referring to FIGS. 4H and 4I, a first pattern 240, 340 provided in the central portion 211 of the light source corresponding portion 210 may be different from a second pattern 250, 350 provided in the edge portion 212 of the light source corresponding portion 210.

Referring to FIG. 4H, the first pattern 240 includes a plurality of first light transmitting portions 241 and a plurality of first light reflecting portions 242 provided between the plurality of first light transmitting portions 241. The plurality of first light transmitting portions 241 may be discontinuously provided along a circumference of at least one closed loop provided in the central portion 211 of the light source corresponding portion 210 among a plurality of closed loops, in which each of the plurality of closed loops is larger than an adjacent closed loop disposed in a direction toward the central portion 211 of the light source corresponding portion 210. The plurality of first light reflecting portions 242 may be filled between the plurality of first light transmitting portions 241. The second pattern 250 includes a plurality of second light transmitting portions 251 and a plurality of second light reflecting portions 252 alternately provided with the plurality of second light transmitting portions 251. The plurality of second light transmitting portions 251 may be continuously provided along a circumference of at least one closed loop provided in the edge portion 212 of the light source corresponding portion 210 among a plurality of closed loops, in which each of the plurality of closed loops is larger than an adjacent closed loop disposed in a direction toward the central portion 211 of the light source corresponding portion 210.

Thicknesses of the plurality of first light transmitting portions 241 and the plurality of second light transmitting portions 251 may be increased as being directed toward the outside of the light source corresponding portion 210. In other words, the thicknesses of the plurality of first light transmitting portions 241 provided in the central portion 211 of the light source corresponding portion 210 may be increased while nearing the circumference of the central portion 211 of the light source corresponding portion 210. In addition, thicknesses of the plurality of second light transmitting portions 251 provided in the edge portion 212 of the light source corresponding portion 210 may be increased as a distance from the central portion 211 of the light source corresponding portion 210 increases. The change in thickness of the plurality of first light transmitting portions 241 and the plurality of second light transmitting portions 251 may have a certain inclination over at least one of the central portion 211 of the light source corresponding portion 211 and the edge portion 212 of the light source corresponding portion 211.

At least one of an interval between first light transmitting portions 241 adjacent to each other among the plurality of first light transmitting portions 241, an interval between second light transmitting portions 251 adjacent to each other among the plurality of second light transmitting portions 251, and an interval between a first light transmitting portion 241 and a second light transmitting portion 251 among the plurality of first light transmitting portions 241 and the plurality of second light transmitting portions 251 may be decreased as being directed to the outside of the light source corresponding portion 210.

Referring to FIG. 4I, the first pattern 340 includes a plurality of first light transmitting portions 341 provided on a plurality of rows that cross each other to form an intersection A and a plurality of first light reflecting portions 342 provided between the plurality of first light transmitting portions 341. The plurality of first light reflecting portions 342 may be filled between the plurality of first light transmitting portions 341. The plurality of first light transmitting portions 341 may be discontinuously provided on the plurality of rows.

In other words, the first pattern 340 may include the plurality of first light transmitting portions 341 provided on the plurality of rows radially arranged from the center C of the light source corresponding portion 210 and the plurality of first light reflecting portions 342 provided between the plurality of first light transmitting portions 341. The plurality of first light reflecting portions 342 may be filled between the plurality of first light transmitting portions 341. The plurality of first light transmitting portions 341 may be discontinuously provided on the plurality of rows.

The second pattern 350 includes a plurality of second light transmitting portions 351 provided along a circumference of a circle centered with respect to the intersection A and a plurality of second light reflecting portions 352 alternately provided with the plurality of second light transmitting portions 351.

Referring to FIGS. 4J and 4K, the plurality of light transmitting portions 213 are formed along the circumference of the central portion 211 of the light source corresponding portion 210, and each of the plurality of light transmitting portions 213 is larger than an adjacent light transmitting portion disposed in a direction toward the central portion 211 of the light source corresponding portion 210. The plurality of light transmitting portions 213 may include a closed loop shape. FIGS. 4J and 4K illustrate a hexagonal shape as the closed loop shape.

Referring to FIG. 4J, the plurality of light transmitting portions 213 may include a hexagonal shape, with each light transmitting portion being larger than an adjacent light transmitting portion disposed in a direction toward the central portion 211 of the light source corresponding portion 210.

An interval between adjacent light transmitting portions 213 in the edge portion 212 among the plurality of light transmitting portions 213 is narrower than an interval between adjacent light transmitting portions 213 in the central portion 211 among the plurality of light transmitting portions 213. An interval between light transmitting portions 213 adjacent to each other among the plurality of light transmitting portions 213 may be decreased as a distance from the central portion 211 of the light source corresponding portion 210 increases.

Referring to FIG. 4K, the plurality of light transmitting portions 213 may include hexagonal shape, with each hexagonal shape being larger than an adjacent hexagonal shape disposed in a direction toward the central portion 211 of the light source corresponding portion 210. Thicknesses of the plurality of light transmitting portions 213 in the edge portion 212 may be greater than thicknesses of the light transmitting portions 213 in the central portion 211. The thicknesses of the plurality of light transmitting portions 213 may be increased as a distance from the central portion 211 of the light source corresponding portion 210 increases.

Figure 5:
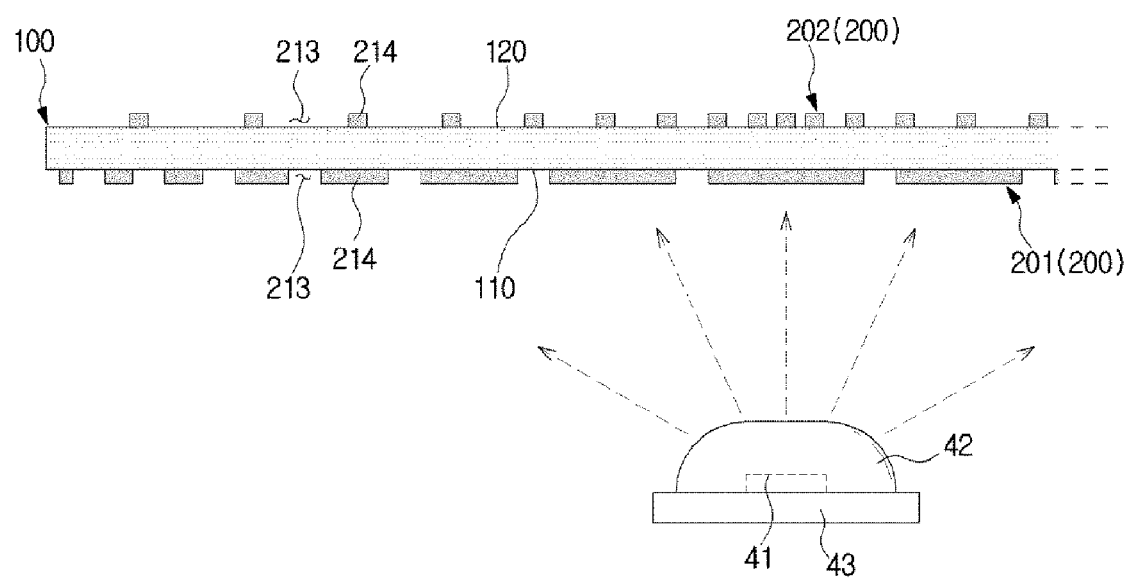
FIG. 5 is a cross sectional view illustrating a display module of a display apparatus according to another exemplary embodiment.

FIG. 5 is a cross sectional view illustrating a display module of a display apparatus according to another exemplary embodiment. In the following description, details of elements or operations identical to those described with reference to FIGS. 1 to 4K will be omitted. Hereinafter, the first surface 110 of the light diffusion plate 100 refers to the incident surface 110 of the light diffusion plate 100.

Referring to FIG. 5, the at least one light diffusion layer 200 may include a first light diffusion layer 201 and a second light diffusion layer 202. The first light diffusion layer 201 may be provided on the first surface 110 of the light diffusion plate 100 onto which light emitted from the plurality of light sources 41 is incident. The second light diffusion layer 202 may be provided on the second surface 120 of the light diffusion plate 100 which faces the display panel 50. The at least one light diffusion layer 200 may have various patterns described in FIGS. 4A to 4K. The pattern formed on the first light diffusion layer 201 may be the same as or different from the pattern formed on the second light diffusion layer 202. The at least one light diffusion plate 200 illustrated on FIG. 5 may be integrally formed with the light diffusion plate 100. In other words, referring to FIG. 5, the plurality of light transmitting portions 213 and the plurality of light reflecting portions 214 may be formed directly on at least one surface of the light diffusion plate 100.

Figure 6:
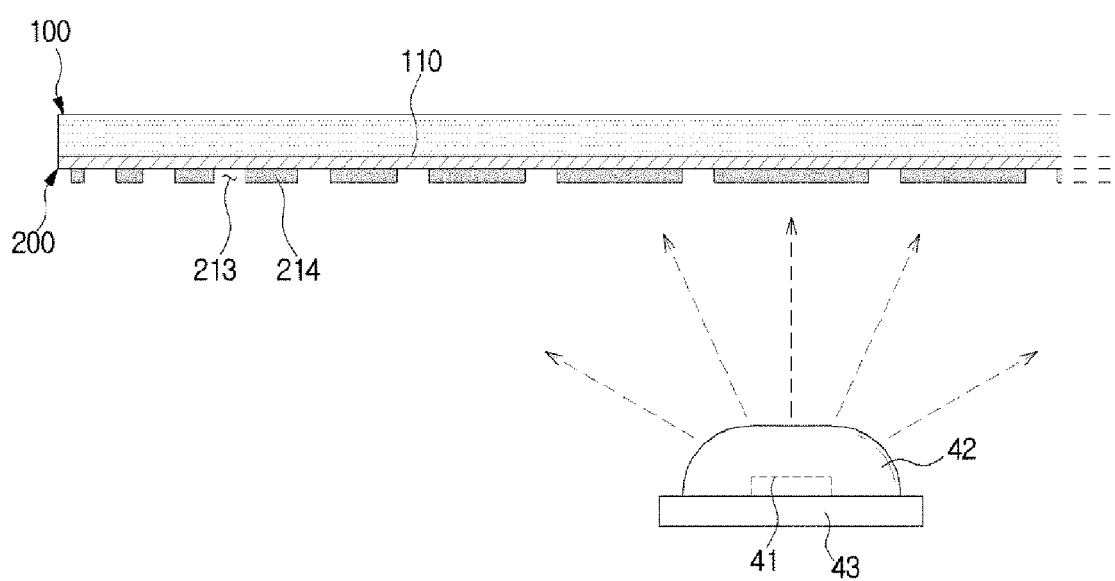
FIG. 6 is a cross sectional view schematically illustrating a display module of a display apparatus according to still another exemplary embodiment.

FIG. 6 is a cross sectional view schematically illustrating a display module of a display apparatus according to still another exemplary embodiment. In the following description, details of elements or operations identical to those described with reference to FIGS. 1 to 5 will be omitted. Hereinafter, the first surface 110 of the light diffusion plate 110 refers to the incident surface 110 of the light diffusion plate 100

Referring to FIG. 6, the at least one light diffusion layer 200 may be separately provided from the light diffusion plate 100, and coupled to at least one surface of the light diffusion plate 100. The at least one light diffusion layer 200 may be provided in the form of a film. The at least one light diffusion layer 200 may be attached to the light diffusion plate 100.

The at least one light diffusion layer 200 may be attached to at least one surface of the light diffusion plate 100. In detail, the at least one light diffusion layer 200 may be attached to at least one of the first surface 110 and the second surface 120 of the light diffusion plate 100. The at least one light diffusion layer 200 may be attached to the first surface 110 of the light diffusion plate 100.

Although the method of improving the uniformity of brightness has been provided by forming the at least one light diffusion layer 200 including the plurality of light transmitting portions 213 and the plurality of light reflecting portions 214 filled with white ink on the light diffusion plate 100, the following description will be made in relation to a method of improving the uniformity of brightness by applying a concave-convex structure to the light diffusion plate 100.

Figure 7A:
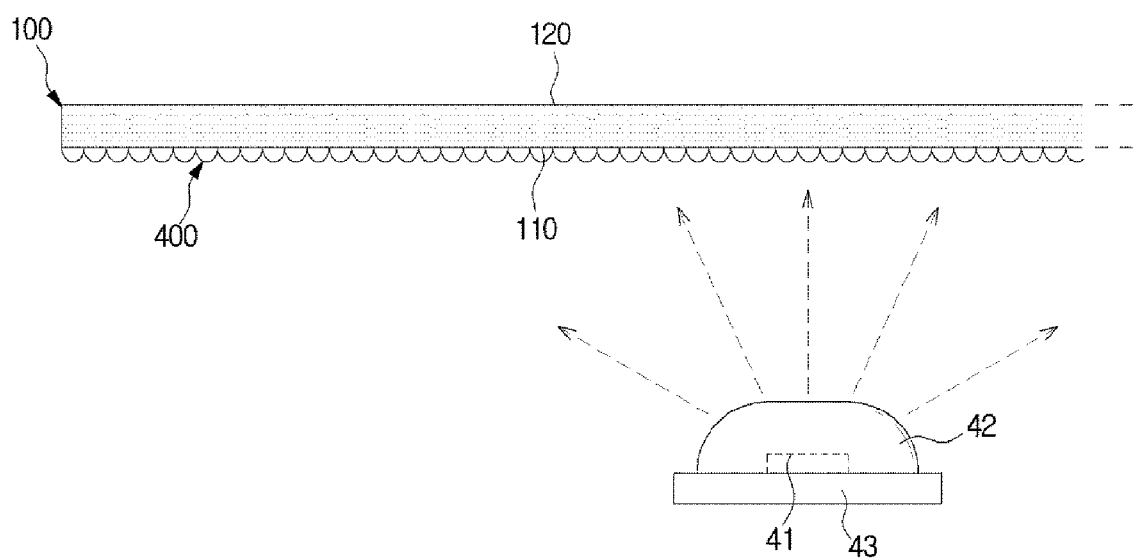
FIGS. 7A to 7C are cross sectional views each schematically illustrating a display module of a display apparatus according to still another exemplary embodiment, the display module including a light diffusion plate on which a concave-convex structure is formed in various shapes.
Figure 7B:
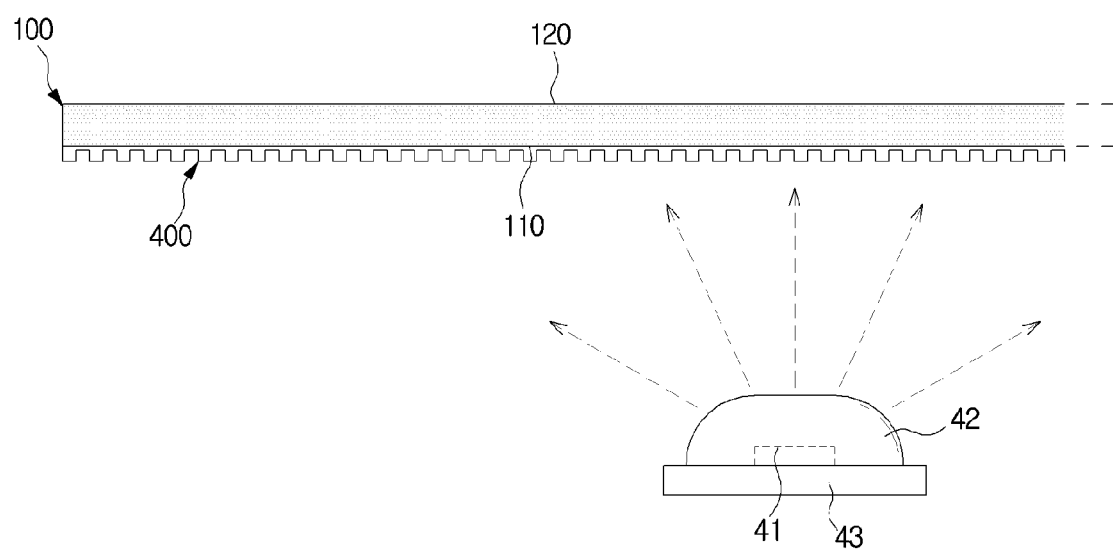
Figure 7C:
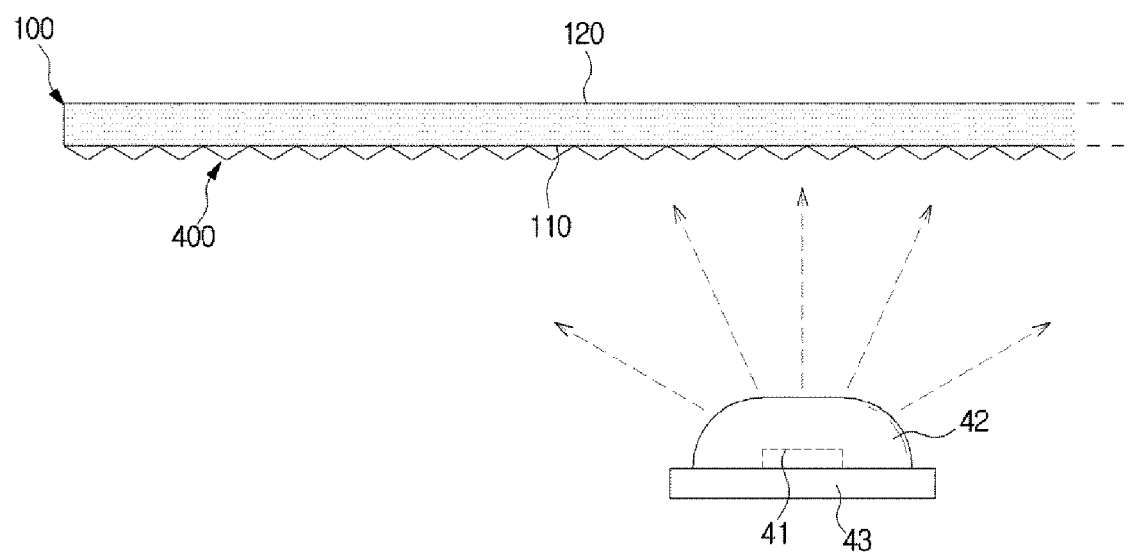

FIGS. 7A to 7C are cross sectional views schematically illustrating a display module of a display apparatus according to still another exemplary embodiment, the display module including a light diffusion plate on which various concave-convex structures are formed. In the following description, details of elements or operations identical to those described with reference to FIGS. 1 to 5 will be omitted. Hereinafter, the first surface 110 of the light diffusion plate 100 refers to the incident surface 110 of the light diffusion plate 100.

Referring to FIGS. 7A to 7C, a concave-convex structure 400 may be formed on the light diffusion plate 100 in various shapes. In detail, the concave-convex structure 400 in various shapes may be formed on at least one of the first surface 110 and the second surface 120. The concave-convex structure 400 may be formed on the first surface 110 of the light diffusion plate 100.

The concave-convex structure 400 may include various shapes, for example, a curved surface as shown in FIG. 7A, a shape of a square pillar shape as shown in FIG. 7B, or a shape of a pyramid as shown in FIG. 7C.

When the concave-convex structure 400 is applied to the light diffusion plate 100, light is recycled between the plurality of light sources 41 and the light diffusion plate 100 through reflection, a sufficient length of light travel path is ensured, and thus the display apparatus 1 is made to have a slim design. In addition, light generated from the plurality of light sources 41 may be uniformly distributed throughout the entire area of the display panel 50.

As is apparent from the above, the light diffusion plate is provided with at least one light diffusion layer including a plurality of light transmitting portions whose density in the edge portion of the light source corresponding portion is higher than in the central portion of the light source corresponding portion so that light concentrated on the central portion of the light corresponding portion is diffused, thereby implementing a display apparatus having a uniform brightness on the entire surface of the display panel.

The light diffusion plate is provided with at least one light diffusion layer including a plurality of light reflecting portions filled with white ink, and thus light is recycled between the light source and the light diffusion plate, and a sufficient length of light travel path is ensured even if the distance between the light source and the light diffusion plate is reduced, thereby implementing a display apparatus having a uniform brightness while having a slim design.

Although a few embodiments of the present inventive concept have been shown and described, it would be appreciated by those skilled in the art that changes may be made in these embodiments without departing from the principles and spirit of the disclosure, the scope of which is defined in the claims and their equivalents.

What is claimed is:

1. A display apparatus comprising:
a display panel;
a plurality of light sources configured to emit light toward the display panel;
a light diffusion plate disposed between the display panel and the plurality of light sources such that light emitted from the plurality of light sources is diffused and guided to the display panel; and
at least one light diffusion layer provided on one surface of the light diffusion plate and having a light source corresponding portion corresponding to the plurality of light sources,
wherein the at least one light diffusion layer includes a plurality of light transmitting portions in the light source corresponding portion, and
wherein sizes of light transmitting portions among the plurality of light transmitting portions in a central portion of the light source corresponding portion are smaller than sizes of light transmitting portions among the plurality of light transmitting portions in an edge portion of the light source corresponding portion.

2. The display apparatus of claim 1, wherein a density of the plurality of light transmitting portions is increased as a distance from the central portion of the light source corresponding portion increases.

3. The display apparatus of claim 1, wherein the at least one light diffusion layer further includes a plurality of light reflecting portions that are formed between the plurality of light transmitting portions and are filled with white ink.

4. The display apparatus of claim 1, wherein the at least one light diffusion layer is provided on an incident surface of the light diffusion plate onto which light emitted from the plurality of light sources is incident.

5. The display apparatus of claim 1, wherein the plurality of light transmitting portions are provided with a higher density in the edge portion of the light source corresponding portion than in the central portion of the light source corresponding portion.

6. The display apparatus of claim 1, wherein intervals between the light transmitting portions in the edge portion of the light source corresponding portion are smaller than intervals between the light transmitting portions in the central portion of the light source corresponding portion.

7. The display apparatus of claim 1, wherein the light source corresponding portion comprises:
a plurality of first rows arranged in a first direction; and
a plurality of second rows arranged in a second direction and forming a plurality of intersections by crossing the plurality of first rows,
wherein the plurality of light transmitting portions are formed on the plurality of intersections.

8. The display apparatus of claim 7, wherein sizes of the plurality of light transmitting portions formed along at least one of the plurality of first rows and the plurality of second rows are increased as a distance from the central portion of the light source corresponding portion increases.

9. The display apparatus of claim 7, wherein at least one of an interval between the plurality of first rows and an interval between the plurality of second rows is decreased as a distance from the central portion of the light source corresponding portion increases.

10. The display apparatus of claim 1, wherein the plurality of light transmitting portions include light transmitting portions formed around a circumference of the central portion of the light source corresponding portion, each light transmitting portion of the light transmitting portions formed around the circumference of the central portion of the light source corresponding portion being larger than an adjacent light transmitting portion disposed in a direction toward the central portion of the light source corresponding portion.

11. The display apparatus of claim 10, wherein the light transmitting portions formed around the circumference of the central portion of the light source corresponding portion include a closed loop shape.

12. The display apparatus of claim 10, wherein thicknesses of the light transmitting portions formed around the circumference of the central portion of the light source corresponding portion are increased as a distance from the central portion of the light source corresponding portion increases.

13. The display apparatus of claim 10, wherein intervals between light transmitting portions adjacent to each other among the light transmitting portions formed around the circumference of the central portion of the light source corresponding portion are decreased as a distance from the central portion of the light source corresponding portion increases.

14. The display apparatus of claim 1, wherein the at least one light diffusion layer comprises:
    a first light diffusion layer provided on a first surface of the light diffusion plate onto which light emitted from the plurality of light sources is incident; and
    a second light diffusion layer provided on a second surface of the light diffusion plate facing the display panel.

15. The display apparatus of claim 1, wherein the at least one light diffusion layer is integrally formed with the light diffusion plate.

16. The display apparatus of claim 1, wherein the at least one light diffusion layer is provided in the form of a film, and the at least one light diffusion layer is attached to the light diffusion plate.

17. A light diffusion plate configured to diffuse light emitted from a plurality light sources, the light diffusion plate comprising:
    a body; and
    at least one light diffusion layer provided on the body, having a light source corresponding portion corresponding to the plurality of light sources, and formed with a pattern including a plurality of light transmitting portions and a plurality of light reflecting portions,
    wherein a ratio of the plurality of light transmitting portions to the plurality of light reflecting portions at an edge portion of the light source corresponding portion is larger than a ratio of the plurality of light transmitting portions to the plurality of light reflecting portions at a central portion of the light source corresponding portion.

18. The light diffusion plate of claim 17, wherein a ratio of the plurality of light transmitting portions to the plurality of light reflecting portions is increased as a distance from the central portion of the light source corresponding portion increases.

19. The light diffusion plate of claim 17, wherein the plurality of light reflecting portions are filled with white ink.

20. The light diffusion plate of claim 17, wherein the plurality of the light reflecting portions are more densely formed in the central portion of the light source corresponding portion than in the edge portion of the light source corresponding portion, and the plurality of the light transmitting portions are more densely formed in the edge portion of the light source corresponding portion than in the central portion of the light source corresponding portion.

* * * * *